United States Patent
Jamal et al.

(10) Patent No.: US 7,544,340 B2
(45) Date of Patent: Jun. 9, 2009

(54) METHOD FOR CREATING A GAS-LIQUID CONTACT AREA

(75) Inventors: Aqil Jamal, Grand Island, NY (US); Howard S. Meyer, Hoffman Estates, IL (US); Nagaraju Palla, Woodridge, IL (US); Dennis Leppin, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 195 days.

(21) Appl. No.: 11/717,251

(22) Filed: Mar. 13, 2007

(65) Prior Publication Data
US 2008/0226525 A1  Sep. 18, 2008

(51) Int. Cl.
*B01D 53/22* (2006.01)
*B01D 53/52* (2006.01)
*C10L 3/10* (2006.01)

(52) U.S. Cl. ............. 423/220; 48/127.3; 48/127.5; 95/45; 95/49; 95/235; 96/4; 96/8; 96/10

(58) Field of Classification Search ........... 423/220; 48/127.3, 127.5; 95/45, 49, 235; 96/4, 8, 96/10
See application file for complete search history.

(56) References Cited

U.S. PATENT DOCUMENTS

| | | | |
|---|---|---|---|
| 3,956,112 A | 5/1976 | Lee et al. | |
| 4,268,279 A | 5/1981 | Shindo et al. | |
| 5,693,230 A | 12/1997 | Asher | |
| 5,749,941 A * | 5/1998 | Jansen et al. | 95/44 |
| 5,935,646 A | 8/1999 | Raman et al. | |
| 6,136,282 A | 10/2000 | Fisher | |
| 6,165,253 A * | 12/2000 | Sirkar et al. | 96/6 |
| 6,228,145 B1 | 5/2001 | Falk-Pedersen et al. | |
| 6,355,092 B1 | 3/2002 | Jansen et al. | |
| 7,316,728 B2 * | 1/2008 | Parekh et al. | 95/56 |

* cited by examiner

*Primary Examiner*—Timothy C Vanoy
(74) *Attorney, Agent, or Firm*—Mark E. Fejer

(57) ABSTRACT

A method for contacting a liquid with a gas in which the gas is introduced into a vessel containing at least one hollow fiber membrane having a plurality of porous hollow fibers. The liquid is introduced into a lumen of at least a portion of the plurality of porous hollow fibers at a liquid pressure sufficient to overcome a resistance to wetting of the porous hollow fibers, thereby covering at least a portion of an outer surface of the plurality of porous hollow fibers with the liquid and providing intimate contact between the gas and the liquid.

17 Claims, 3 Drawing Sheets

METHOD FOR CREATING A GAS-LIQUID CONTACT AREA

BACKGROUND OF THE INVENTION

1. Field of the Invention

This invention relates to a method for providing intimate contact between a gas and a liquid to promote their mixing for a variety of applications. More particularly, this invention relates to the use of a hollow fiber contactor for providing intimate contact between a gas and a liquid to promote their mixing. The method of this invention is particularly suitable for removing hydrogen sulfide ($H_2S$) from gas streams.

2. Description of Related Art

Hydrogen sulfide is a contaminant in much of the natural gas produced in the United States and worldwide. It is a poisonous and corrosive gas that must be removed prior to bringing the gas to the customer. The acceptable level for transportation and use is generally less than 4 ppm by volume (4 ppmv). At low concentration levels generally less than about 100 ppmv, but depending upon the total flow so as to address total quantities of hydrogen sulfide of up to a few hundred pounds per day, various scavenger processes are employed, including flowing the contaminated gas through vessels full of either solid adsorbents or liquid solvents, or the injection of liquid solvents into the gas stream. In the latter case, various means are employed to provide gas-liquid interface area, because the reaction takes place at the liquid surface. Long lengths of pipe are required to provide sufficient time for the hydrogen sulfide to react with the injected solvents in the gas stream. These pipes add to the expense of hydrogen sulfide removal, especially in situations where size and weight are important, such as offshore production. In addition, as many existing installations do not have adequate piping lengths to effect the reduction of the hydrogen sulfide to the desired specification by scavenger, or have pipe of such diameter that contact with the scavenger is not effective, a method to improve the contact of scavenger and gas-borne hydrogen sulfide is desirable.

This issue is addressed in part, for example, by U.S. Pat. No. 6,136,282, which teaches a method of hydrogen sulfide removal from natural gas employing a high surface area contactor for providing intimate contact between the solvent and gas in which the flow of gas is divided into a plurality of smaller, parallel streams or pipes rather than one large pipe. While the method provides for increased contact between the scavenger and the gas-borne hydrogen sulfide compared to earlier methods and systems, and while the amount of pipe and space required to carry out the method are reduced compared to earlier methods and systems, it nevertheless remains a desirable objective to further reduce the amount of pipe and space required to remove the hydrogen sulfide from natural gas. This is achievable by further increasing the contactor surface area.

A number of prior patents teach hollow fiber membranes for fluid treatment. U.S. Pat. No. 3,956,112 teaches hollow fiber non-porous membrane solvent extraction by passing a first liquid solvent through lumen of hollow fiber membranes and a solute in a second solvent, which is immiscible with the first solvent, through the space surrounding the hollow fiber membranes, the solute diffusing across the solvent swollen membrane to the first solvent without intermixing the two liquids. U.S. Pat. No. 4,268,279 teaches microporous hollow fibers with a liquid in the lumen and a fluid outside the fiber allowing gaseous components to transfer through the microporous fiber to the inside or outside of the fiber. U.S. Pat. No. 6,228,145 B1 teaches the use of membrane gas/liquid contactors for removing and preventing discharge of carbon dioxide from combustion gases and natural gas from installations for production of oil and/or gas, wherein the combustion gas is passed to an absorber containing a solvent, where carbon dioxide is absorbed in the solvent, and the resulting purified combustion gas, substantially free of carbon dioxide, is discharged into the atmosphere. The carbon dioxide-rich solvent is passed into a desorber where the carbon dioxide is removed from the solvent and the substantially carbon dioxide-free solvent is recycled to the absorber. The membrane gas/liquid contactors are employed in both the absorber and the desorber. U.S. Pat. No. 6,355,092 teaches an apparatus for performing membrane gas/liquid absorption at elevated pressure comprising a pressure vessel in which a membrane unit is provided for separate feed-through of the gas phase and the liquid phase in such a way that exchange of components to be absorbed can take place between the gas phase and the liquid phase, the flow direction of the gas phase through the absorber being essentially perpendicular to the flow direction of the liquid phase through the absorber. However, neither the '145 patent nor the '092 patent disclose mixing of, or contact between, the liquid and the gas.

SUMMARY OF THE INVENTION

It is, thus, one object of this invention to provide a method for providing intimate contact between a gas and a liquid to promote their mixing.

It is one object of this invention to provide a method for sweetening sour natural gas.

These and other objects of this invention are addressed by a method for contacting a liquid with a gas in which the gas is introduced into a vessel containing at least one hollow fiber membrane comprising a plurality of microporous hollow fibers. The liquid is introduced into a lumen of at least a portion of the plurality of microporous hollow fibers at a liquid pressure sufficient to overcome a resistance to wetting of the microporous hollow fiber, resulting in covering of at least a portion of the outer surface of the plurality of microporous hollow fibers with a thin film of the liquid, and, in turn, resulting in intimate contact between the gas and the liquid. The hollow fiber membrane provides a large surface area within a small volume for the contacting to occur.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed and claimed herein is a method for providing intimate contact between a gas and a liquid to promote their mixing and is suitable for use in most any application in which the mixing of a gas and a liquid may be preferred for achieving the objective of the application. Such applications include, but are not limited to, evaporation of the liquid, reaction of the gas and liquid, or mass transfer of one or more components of the gas into the liquid. Although described herein in the context of an application for removal of hydrogen sulfide from a gas stream, it is to be understood that this description is in no way intended to limit the scope of applications to which the method of this invention may be applied.

To achieve the desired intimate contact between the gas and liquid, the method of this invention employs a high surface area contactor in the form of a microporous hollow fiber membrane comprising a plurality of microporous hollow fibers. A liquid of interest is introduced into the lumen of at least a portion of the plurality of microporous hollow fibers. A critical element of the method of this invention is the requirement that the liquid be introduced into the lumen at a pressure sufficient to cause the wetting of the membrane without bursting or collapsing the hollow fibers. At such a pressure, a portion of the liquid passes through the micropores of the hollow fibers, wetting the outer surface of the hollow fibers. A gas of interest is brought into contact with the liquid on the wetted outer surface of the hollow fibers, producing the desired intimate contact and, thus, mixing, of the gas with the liquid. It will be appreciated that the hollow fiber membrane employed in the method of this invention provides a large surface area within a relatively small volume.

Figure 1:
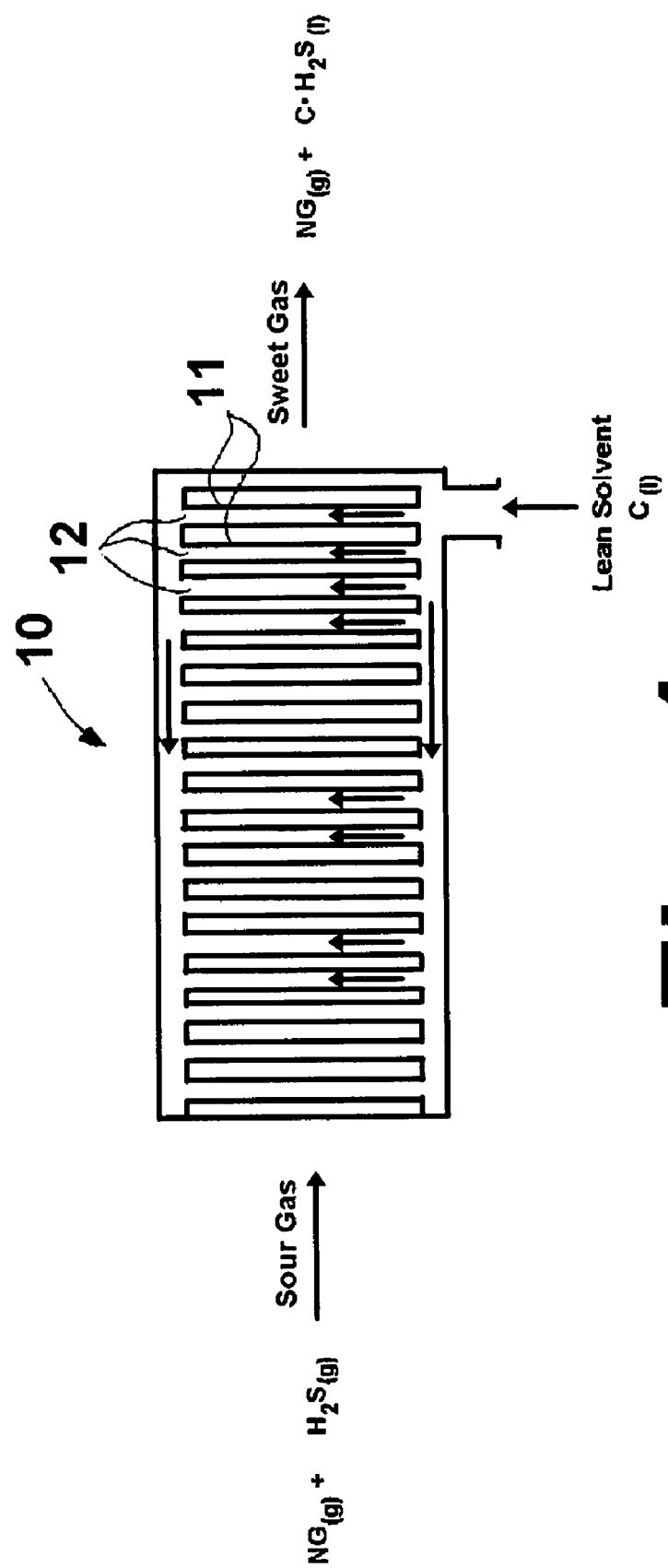
FIG. 1 is a schematic diagram of the method for sweetening sour gas using a microporous hollow fiber membrane in accordance with one embodiment of this invention.
Figure 2:
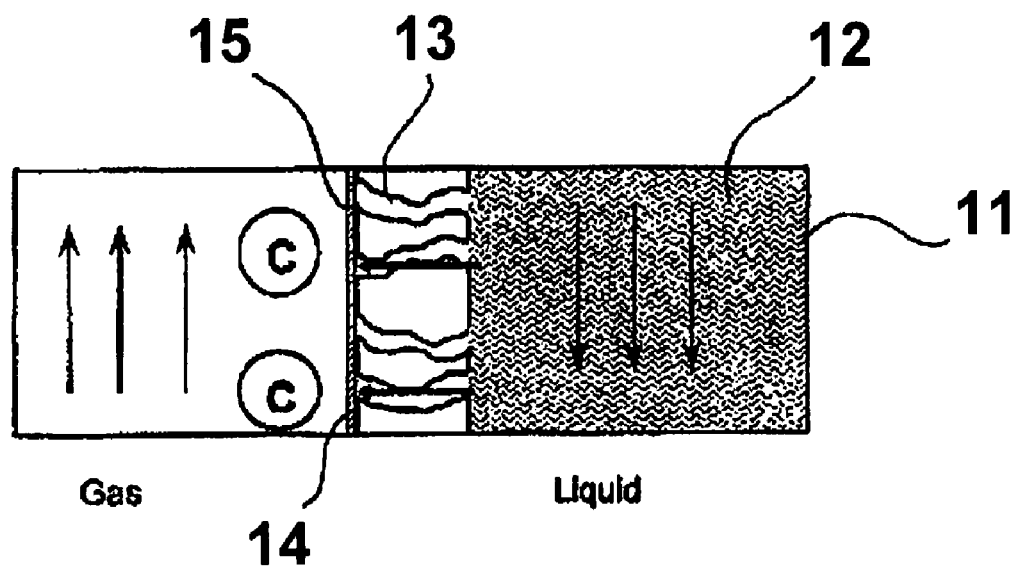
FIG. 2 is a schematic diagram of a section of a microporous hollow fiber membrane showing the movement of fluids relative thereto in accordance with one embodiment of this invention.
Figure 3:
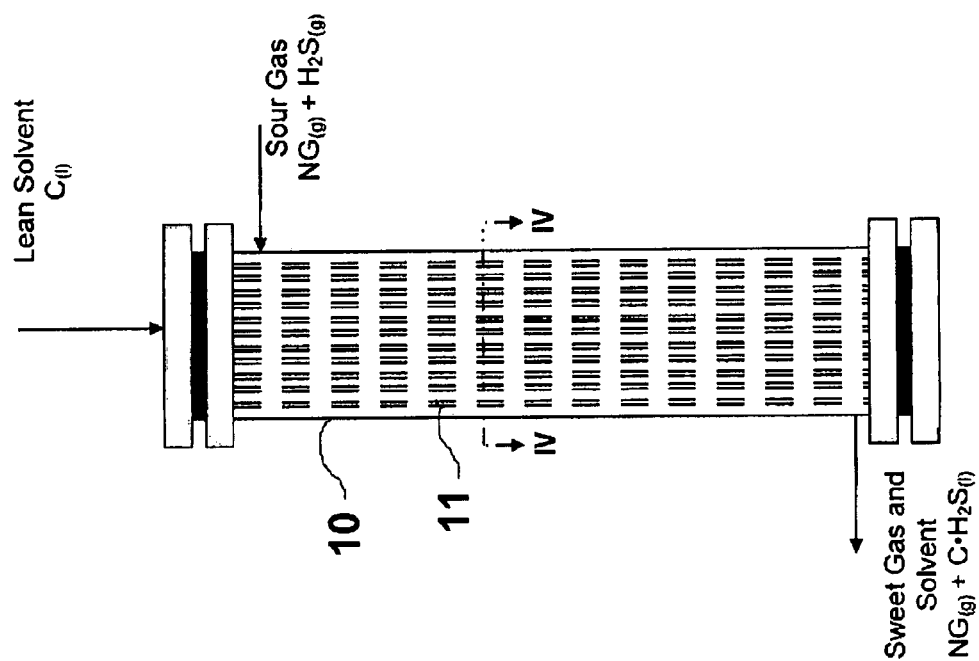
FIG. 3 is a schematic diagram of a device for sweetening sour gas using a microporous hollow fiber membrane in accordance with one embodiment of this invention.
Figure 4:
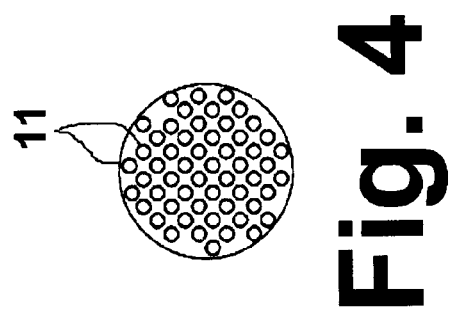
FIG. 4 is a view of the device of FIG. 3 taken along the line IV-IV.

In accordance with one embodiment of this invention, as shown in FIGS. 1 and 3, a sour gas comprising natural gas and greater than about 4 ppmv hydrogen sulfide, but less than about 1000 ppmv, and preferably less than about 200 ppmv, at pressures up to about 2000 psig, is introduced into a vessel containing hollow fiber membrane 10. Hollow fiber membrane 10 comprises a plurality of microporous hollow fibers 11 (FIGS. 3 and 4) and means for introducing a lean solvent, C, into the lumen 12 of the hollow fibers 11, shown in FIG. 2. The lean solvent flows through micropores 13 of the hollow fibers to form a film or coating on the outer surface 14 of the hollow fibers where it is contacted with the sour gas. The solvent may be any of the commercially available solvents used for scavenging hydrogen sulfide. Upon contact with the sour gas, the thin film of reactive solvent is carried off the outer surface of the hollow fibers of the membrane into the gas stream with the reacted hydrogen sulfide and the solvent to be later collected and separated from the gas stream using conventional means. Accordingly, the output from the hollow fiber membrane is a sweet gas comprising natural gas and reacted hydrogen sulfide in the solvent.

The materials of construction of the hollow fiber membrane must be chemically inert to the reactive solvent and must not be wettable by the solvent unless sufficient differential pressure is induced by pumping the liquid at a higher pressure than the gas pressure, but less than the burst pressure of the hollow fibers. Typically, the differential pressure will be in the range of about 1 to 2 bar. Expanded polytetrafluoroethylene (e-PTFE) ribbon membranes have been shown to have acceptable properties for amine and physical solvents tested.

Other materials suitable for use in the method of this invention include inorganic and ceramic membranes. Inorganic and ceramic membranes are particularly suitable for use in high temperature or hostile environments in which polymer membranes cannot be employed. Exemplary of a suitable inorganic membrane is a molecular sieve silica membrane as taught, for example, by U.S. Pat. No. 5,935,646. Exemplary of suitable ceramic membranes are membranes made of $Al_2O_3$, which membranes are available from Media and Process Technology, Inc., Pittsburgh Pa.

In addition to providing a high surface contact area for removal of hydrogen sulfide from natural gas in accordance with one embodiment of this invention, the method of this invention provides additional benefits including the means to remove low levels of hydrogen sulfide from natural gas to lower levels than by other means and with equal or lower quantities of scavenging agent in a reduced length of piping, means for decreasing the amount of reactive solvent required to remove the hydrogen sulfide from the natural gas compared to conventional methods, means for adding a liquid to a gas stream, and means for evaporating a liquid stream into a flowing gas stream.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for contacting a liquid with a gas comprising the steps of:
   introducing said gas into a vessel containing at least one hollow fiber membrane comprising a plurality of porous hollow fibers; and
   introducing said liquid into a lumen of at least a portion of said plurality of porous hollow fibers at a liquid pressure sufficient to overcome a resistance to wetting of said porous hollow fiber, thereby covering at least a portion of an outer surface of said plurality of porous hollow fibers with said liquid, resulting in contact between said gas and said liquid and penetration of a portion of said liquid into said gas.

2. A method in accordance with claim 1, wherein said liquid comprises at least one solvent and said gas comprises at least one component capable of reacting with, or being soluble in, said at least one solvent.

3. A method in accordance with claim 2, wherein said at least one component is hydrogen sulfide.

4. A method in accordance with claim 3, wherein said gas comprises between about 0 ppmv and about 1000 ppmv of said hydrogen sulfide.

5. A method in accordance with claim 3, wherein said gas comprises between about 0 ppmv and about 200 ppmv of said hydrogen sulfide.

6. A method in accordance with claim 5, wherein said gas comprises at least 4 ppmv of said hydrogen sulfide.

7. A method in accordance with claim 1, wherein said hollow fiber membrane is an expanded polytetrafluoroethylene ribbon membrane.

8. A method in accordance with claim 1, wherein said hollow fiber membrane is one of an inorganic membrane and a ceramic membrane.

9. A method in accordance with claim 1, wherein said gas is a mixture comprising natural gas and hydrogen sulfide.

10. A method in accordance with claim 1, wherein said gas is introduced into said vessel at a gas pressure less than or equal to 2000 psig.

11. A method in accordance with claim 10, wherein said liquid pressure is greater than said gas pressure.

12. A method for removal of hydrogen sulfide from a gas comprising said hydrogen sulfide, the method comprising the steps of:

introducing a liquid comprising an hydrogen sulfide scavenging agent into a lumen of at least a portion of a plurality of porous hollow fibers of a hollow fiber membrane at a liquid pressure sufficient to overcome a resistance to wetting of said porous hollow fibers, thereby forming a liquid film on an outer surface of said portion of said plurality of porous hollow fibers;

contacting said liquid film with said gas, thereby reacting in said gas at least a portion of said hydrogen sulfide with said hydrogen sulfide scavenging agent, forming at least one reaction product; and conducting said at least one reaction product away from said hollow fiber membrane.

13. A method in accordance with claim 12, wherein said gas is natural gas.

14. A method in accordance with claim 12, wherein a concentration of said hydrogen sulfide in said gas is in a range of about 4 ppmv to about 2000 ppmv.

15. A method in accordance with claim 12, wherein said hollow fiber membrane is an expanded polytetrafluoroethylene ribbon membrane.

16. A method in accordance with claim 12, wherein said hollow fiber membrane is one of an inorganic membrane and a ceramic membrane.

17. A method in accordance with claim 12, wherein said liquid pressure is less than or equal to about 2000 psig.

* * * * *